United States Patent [19]

Gebauer et al.

[11] 4,074,007

[45] Feb. 14, 1978

[54] COATING COMPOSITION

[75] Inventors: Gerhard Gebauer, Burgkirchen (Alz); Johannes Brandrup, Neu Isenburg; Kurt Kraft, Auringen, Taunus; Franz Mayer, Burgkirchen (Alz), all of Germany

[73] Assignee: Hoechst Aktiengesellschaft, Frankfurt am Main, Germany

[21] Appl. No.: 780,466

[22] Filed: Mar. 23, 1977

Related U.S. Application Data

[63] Continuation of Ser. No. 560,295, March 20, 1975, abandoned.

[30] Foreign Application Priority Data

Mar. 26, 1974 Germany .............................. 2414389

[51] Int. Cl.$^2$ .................... B32B 27/04; C08J 3/08; C08K 5/00; C08L 79/04
[52] U.S. Cl. .................... 428/411; 260/30.2; 260/30.6 R; 260/30.8 R; 260/30.8 DS; 260/31.2 N; 260/32.4; 260/32.6 NT; 260/32.8 N; 260/33.6 F; 260/33.8 F; 260/34.2; 260/900; 428/422; 428/441; 428/461
[58] Field of Search ......... 260/30.8 DS, 34.2, 32.8 N, 260/33.6 F, 32.6 NT, 31.2 N, 30.2, 30.8 R, 33.8 F, 30.6 R, 32.4; 428/411

[56] References Cited

U.S. PATENT DOCUMENTS

| | | | |
|---|---|---|---|
| 2,496,978 | 1/1950 | Berry | 526/58 |
| 2,777,783 | 1/1957 | Welch | 260/34.2 |
| 3,075,939 | 1/1963 | Bauer et al. | 260/34.2 |
| 3,293,203 | 12/1963 | Paulus | 260/34.2 |
| 3,340,222 | 9/1967 | Fang | 260/34.2 |

FOREIGN PATENT DOCUMENTS

| | | |
|---|---|---|
| 1,049,099 | 1/1959 | Germany. |
| 1,494,402 | 5/1971 | Germany. |
| 1,920,845 | 11/1970 | Germany. |
| 2,030,233 | 12/1971 | Germany. |
| 2,031,046 | 12/1971 | Germany. |
| 2,235,885 | 2/1974 | Germany. |
| 2,303,239 | 7/1974 | Germany. |
| 1,334,890 | 10/1973 | United Kingdom. |

OTHER PUBLICATIONS

Brunauer et al., Journal of A.C.S., vol. 60, Feb. 1938, pp. 309-319.

Primary Examiner—Allan Lieberman
Attorney, Agent, or Firm—Connolly and Hutz

[57] ABSTRACT

The invention provides a high temperature resistant anti-adhesion and slide lacquer composed substantially of finely distributed low molecular polytetrafluorethylene, a polytriketo-imidazolidine resin and a solvent or solvent mixture.

The system of the invention may be applied to the substrate in one single operation.

15 Claims, No Drawings

COATING COMPOSITION

This application is a continuation of application Ser. No. 560,295 filed Mar. 20, 1975 now abandoned.

The present invention provides a high temperature resistant anti-adhesion and slide lacquer ("slide lacquer" meaning that it has smoothing and anti-tack properties), substantially composed of finely distributed low molecular weight polytetrafluorethylene, a polytriketo-imidazolidine resin (hereinafter called trion resin) and a solvent or solvent mixture.

Coatings of high molecular weight polytetrafluorethylene (PTFE) are generally obtained from aqueous PTFE dispersions. Since these coatings, because of the known antiadhesive properties of PTFE, do not adhere sufficiently to the substrate, this substrate has to be pretreated in a suitable manner, for example by sandblasting, and furthermore, adhesive substances the choice of which depends on the kind of the substrate in question have to be added to the PTFE dispersion. However, this results in a deterioration of the required properties of PTFE such as antiadhesive behavior, low coefficient of viscosity etc. In order to maintain these properties at the surface of the coating, a top layer of pure PTFE containing, if any, only very small amounts of usual additives is coated over the above primer coating. Thus, in order to obtain a coating having the desired properties, these systems require three different operations:

1. pretreatment of the substrate (for example sandblasting)
2. coating with a primer containing a small amount of PTFE and adhesive substances
3. coating with a top layer of essentially pure PTFE.

Furthermore, aqueous PTFE dispersions have the disadvantageous tendency to irreversible coagulation, especially on prolonged storage. Such coagulation may for example already occur by simply agitating a dispersion which has disintegrated, by mechanical strain or by storage at elevated temperatures or temperatures below the freezing point. Such irreversible coagulation makes the dispersion unserviceable.

In order to overcome these disadvantages, PTFE containing coatings have been already developed which avoid the expensive pretreatment of the substrate and its repeated treatment with primer and top coating. It has been tried to obtain PTFE coatings from stable dispersions of PTFE in organic solvents having no tendency to coagulation. Since the properties of the coatings obtained when using this material, especially the adhesion on the substrate, are insufficient for most applications, these dispersions are mixed with film-forming or binder resins, which mixture, however, causes the loss or at least a serious deterioration of the excellent anti-adhesion, anti-tack and smoothing properties proper to PTFE coatings.

It is therefore the object of the present invention to provide a PTFE containing coating composition in the form of a single-coating system (i.e. in the form of a system being applied to the substrate in one operation only) which is equivalent or superior to the usual double-layer PTFE coatings with respect to anti-adhesive, smoothing and anti-tack behavior, as well as adhesion to the substrate, and which furthermore has an excellent hardness and abrasion resistance.

In accordance with the present invention, there is provided a coating composition substantially composed of a. from 10 to 90 parts by weight of a low molecular weight polytetrafluorethylene having a melt viscosity of from $10^1$ to $10^8$ poises (measured at 380° C by means of the high pressure capillary viscometer), a specific surface of from 1 to 40 $m^2/g$ (measured according to the BET method), and a mean particle diameter of from 0.1 to 50 microns;

b. from 90 to 10 parts by weight of a polymer containing triketoimidazolidine rings and repeated units of the formula

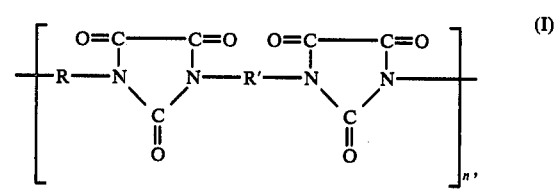

where

R is a mono- to trinuclear, bi- to tetravalent aromatic radical, the aromatic radicals optionally being also quinones, and in polynuclear systems the aromatic radicals optionally being linked by aliphatic radicals or hetero atoms, furthermore the aromatic radicals optionally being mono- or polysubstituted by alkyl, cycloalkyl, alkoxy, aryl or monovalent functional radicals, R' is as defined for R or an aliphatic or cycloaliphatic hydrocarbon radical, R' optionally being interrupted by one or more of the following groups:

$b_1$. amide, imide and/or amidoimide groups, obtained by introduction of polycarboxylic acids, the ratio of the molar equivalents polycarboxylic acid : polyisocyanate being q : (q + 1), and q being from 1 to 40, preferably from 2 to 40;

$b_{21}$. chelate forming azo or azomethine groups;

$b_{22}$. metal chelates of such azo or azomethine groups; the ratio of the molar equivalents of the oxamide acid ester, used for the preparation of the triketo-imidazolidine rings to chelate-forming agents and/or metal chelates being (2 to 94) : (0.1 to 50), and the sum of oxamide acid ester, chelate-forming agent or chelate and possibly present polycarboxylic acids always being 100 mol %, n is an integer of from 1 to 70, preferably from 1 to 40; and c. an aprotic organic solvent having a surface tension of more than 30 dyn/cm, in an amount by weight of from 0.43 to 100 times that of component b); up to 80% of the amount by weight of this aprotic solvent having a surface tension of more than 30 dyn/cm optionally being replaced by another organic solvent not meeting at least one of the two cited requirements, but necessarily having a lower boiling point than the aprotic solvent.

The low molecular weight PTFE having a melt viscosity of from $10^1$ to $10^8$ poises used as component a) of the coating composition of the invention is a product selected from the so-called fluoro-carbon wax series. Such flurocarbon waxes may be prepared by thermal degradation of high molecular PTFE according to preparation methods known from German Pat. No. 1,049,099, U.S. Pat. No. 2,496,978 and especially from German Offenlegungsschrift No. 2,031,046. The latter process is especially advantageous, because a suitable adjustment the pressure allows to direct the pyrolysis to the obtention of products having the desired melt viscosity (or the corresponding molecular weight range). Also products obtained by means of X or gamma ray irradiation according to known processes may be used. Such PTFE degradation waxes obtained by pyrolysis or irradiation generally must be ground to a mean particle size of from 1 to 25 microns, preferably from 5 to 10 microns before use in the coating composition of the invention, since they are often obtained in the form of more or less bulky lumps, which grinding may be carried out in a hammer or jet mill.

As component a) of the coating composition according to the invention, there may be used also a synthetic PTFE wax obtained according to a known process described in German Offenelgungsschrift No. 2,235,885, by telomerization of tetrafluorethylene with a suitable telogene. The aqueous dispersions of low molecular PTFE obtained according to this process may be easily coagulated by means of mechanical forces or electrolytes to form finely distributed white powders, and they may then be used directly without further pretreatment in the coating compositions of the invention.

By low molecular weight polytetrafluoroethylene being employed as component a) of the coating composition of the invention, there is to be understood a PTFE having an apparent melt viscosity of from $10^1$ to $10^8$, preferably from $10^2$ to $10^6$ poises at 380°C (determined by means of the high pressure capillary viscometer as described below).

Such a low molecular PTFE must have furthermore a specific surface of from 1 to 40, preferably from 4 to 40 m²/g, especially from 5 to 26 m²/g (measured according to the so-called BET method, see Brunauer, Emmet and Teller, J. Am. Chem. Soc. 60, 1938, p. 309), and a mean particle size of from 0.1 to 50 microns, preferably from 0.5 to 20 microns, especially from 1 to 12 microns. In the case of a synthetic PTFE wax coagulated from the dispersion, by mean particle size there is to be understood the mean size of the primary particles.

Component (b) of the coating composition of the invention is a so-called "trion resis". By trion resin, there is to be understood a polymer containing triketoimidazolidine rings and repeated units of the formula

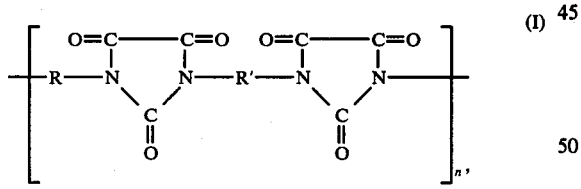

(I)

where R, R' and n are as defined above.

Preferably, in these trion resins, the cited symbols represent the following:

R a bi- or trivalent phenyl radical (that is, having two or three radicals capable of being condensed or added, see formula IV below), or a binuclear aromatic radical. These radicals may be optionally substituted, preferably once or twice, by alkyl having preferably from 1 to 6 carbon atoms (for example methyl, alkyl), cycloalkyl or alkylcycloalkyl having preferably from 6 to 12 carbon atoms, aryl, preferably phenyl, halo-alkyl, especially fluoroalkyl having preferably from 1 to 5 carbon atoms (for example trifluoromethyl), alkoxy having preferably from 1 to 5 carbon atoms (for example methoxy, ethoxy), aryloxy having preferably from 6 to 10 carbon atoms, ketoalkyl having preferably up to 5 carbon atoms (for example $CH_3$—CO—), ketoaryl having preferably up to 10 carbon atoms, carboxyalkyl having preferably up to 6 carbon atoms, carboxyaryl having preferably up to 10 carbon atoms, ester groups having preferably up to 5 carbon stoms (for example $CH_3COO$— or $C_2H_5$—COO—), alkylsulfonyl groups having preferably from 1 to 5 carbon atoms (for example $CH_3SO_3$—), dialkylamino groups having preferably up to 6 carbon atoms, diarylamino, preferably diphenylamino, alkylarylamino having preferably up to 10 carbon atoms, perfluorinated alkoxy, carboxyalkyl or acyl having preferably the abovementioned number of carbon atoms, nitro, cyano or halogen, especially flurine, chlorine or bromine.

In the case of binuclear aromatic radicals, the phenyl nuclei may be directly condensed one to the other, that is, form a naphthyl radical, or they may be linked with each other via a C—C bridge, such as biphenyl, or they may be linked with each other by an aliphatic radical preferably having from 1 to 3 carbon atoms, or by hetero atoms such as oxygen, sulfur, or by hetero atom containing groups such as CO, $SO_2$ or NR (R being alkyl having preferably from 1 to 6 carbon atoms, cycloalkyl having preferably up to 10 carbon atoms, alkylcycloalkyl having preferably up to 10 carbon atoms, or aryl having preferably from 6 to 10 carbon atoms, especially phenyl).

The mono- or binuclear aromatic radicals may also contain hetero-atoms, for example they may be thiophene, benzothiophene, benzothiazole, pyridine, quinoline etc.

Especially preferred for R are bivalent aromatic radicals of the formula

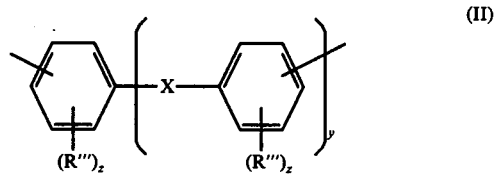

(II)

where
R''' is H or $CH_3$,
X is O, S. $CH_2$, $SO_2$ or zero, preferably O or $CH_2$,
y is 1 or zero, preferably 1,
z is from 1 to 3, preferably 1,
or

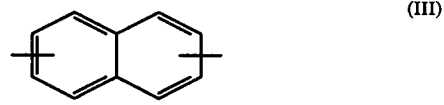

(III)

R' of formula (I) is preferably R as cited above or a bivalent aliphatic or cycloaliphatic radical, especially alkylene or cycloalkylene having up to 20, preferably up to 15, especially from 6 to 12 carbon atoms. Examples are methylene, alkylene, propylene, 2,2'-dimethylpropylene, 3-methylpropylene, butylene, cyclohexylene or cyclohexylene substituted by lower alkyl (1 to 6 carbon atoms). Optionally, these aliphatic or cycloaliphatic radicals may also be substituted by one or more monovalent functional groups, as they are cited above under R, especially trifluoromethyl or nitro or cyano or halogen such as fluorine, chlorine or bromine.

$n$ of formula (I) is preferably from 1 to 40.

The preparation of such trion resins is described in German Offenlegungsschriften Nos. 1,929,845 and 2,030,233, and it is carried out by reaction of oxamide acid esters of the formula $$R - (NH - CO - COOR'')_r \qquad (IV)$$

and polyisocyanates of the formula $$R' - (N = C = O)_s \qquad (V).$$

R and R' of these formulae are as defined in formula (I);

R'' is a hydrocarbon radical, preferably an aliphatic hydrocarbon radical having from 1 to 18 carbon atoms, especially from 1 to 6 carbon atoms, a cycloaliphatic or alkylcycloaliphatic hydrocarbon radical having from 3 to 8 carbon atoms, especially from 6 to 8 carbon atoms, or phenyl, cycloaliphatic/alkylcycloaliphatic hydrocarbon and phenyl optionally being substituted by alkyl radicals each having from 1 to 14, preferably from 1 to 8 carbon atoms; R'' is especially alkyl having from 1 to 6 carbon atoms, for example methyl, ethyl, propyl, butyl, i-butyl, n-hexyl;

$r$ is an integer of from 2 to 4, preferably 2 (bis-oxamide acid ester) and $s$ is an integer of from 2 to 6, preferably from 2 to 4, especially 2 (di-isocyanates).

Suitable polyisocyanates are for example 2,4,6-tri-isocyanato-toluene, 4,4',4''-tri-isocyanto-diphenylmethane, 2,4,4'-tri-isocyanato-diphenylmethane, 2,2',5,5'-tetraisocyanato-diphenylmethane, further suitable polyisocyanates (see German Offenlegungsschrift No. 1,920,845).

The reaction of the cited oxamide acid esters with the cited polyisocyanates is carried out at temperatures of from $-10°$ to $+280°$ C, preferably from 0° to 180° C, in solution or in the melt, preferably in a so-called aprotic solvent characterized below. The reaction may be carried out with or without a catalyst. Suitable catalysts are in principle those normally used also for other reactions of isocyanates with compounds containing reactive hydrogen atoms, such as especially tertiary bases, for example tertiary amines or tertiary phosphines, such as triethylamine, tributylamine, N-isobutylmorpholine, piperidine, N-methylpiperidine, N,N-dimethylaniline, triethylenediamine, triphenylphosphine, trimorpholinephosphine. Other catalysts are for example lithium methylate or benzoate, sodium ethylate, potassium tert.-butylate or organic tin compounds such as dibutylstannic oxide, dimethylstannic stearate, dibutylstannic glycolate, dibutylstannic dilaurate, diphenylstannic oxide or also ferrocene or metal chelates such as iron acetylacetonate, cobalt complexes; all these catalysts may be used individually or in combinations.

The products obtained in these reactions which still contain reactive terminal groups are polymerized by further heating to 120° – 55° C, preferably to 280° – 450° C. By polymerization there is to be understood in this case a chain lengthening by addition and/or condensation.

The molar ratio of oxamide acid ester : polyisocyanate in the reaction is 1 : (0.8 to 2.2), preferably 1 : (0.9 to 1.5) in the case of equal functionality of both components ($r = s$). In the case of different functionality, this molar ratio has to be varied correspondingly.

For the example of bis-oxamide acid ester and di-isocyanate, the reaction proceeds according to the following general scheme:

$$n R''OOC . OC . HN . R . NH . CO . COOR'' +$$
$$n OCN . R' . NCO \xrightarrow{-2n R''OH}$$

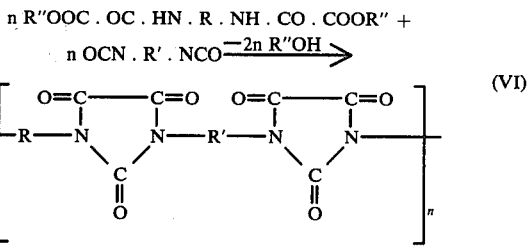

(VI)

The trion resins obtained according to this reaction can be directly employed for the coating composition of the invention with very good results. A further improvement of the advantageous properties is attained when, besides the oxamide acid esters and the polyisocyanates, also polycarboxylic acids are reacted, as described in German Offenlegungsschrift No. 2,030,233, so that polycondensation products are formed which contain additional amide, imide and/or amidoimide groups.

By polycarboxylic acids, there are to be understood carboxylic acids and/or the anhydrides thereof being at least dibasic and no more than hexabasic, preferably no more than tetrabasic, especially di- and tribasic. Advantageously, there are used above all such trion resins the amide, imide or amidoimide group forming components, as described in German Offenlegungsschrift No. 2,303,239, in the form of polycarboxylic acids are reacted in a first step with the isocyanate, thus forming a precondensate having free NCO terminal groups, which precondensate is then reacted with the oxamide acid ester in a second step. The precondensate is formed at temperatures of a maximum of 70° C, preferably of from 40° to 60° C, and the second step requires temperatures of from 70° to 270° C, preferably from 100° to 220° C. A great number of polycarboxylic acids (or their anhydrides) suitable for this reaction are described and proposed in German Offenlegungsschriften Nos. 2,030,233 and 2,303,239, among them for example the following: isophthalic, trimellitic, pyromellitic, terephthalic, benzophenotetracarboxylic, 1,4,5,8-naphthalenetetracarboxylic, furthermore 2,5-dianilinoterephthalic, 2,5-ditoluodinoterephthalic, hemimellitic, mellitic, maleic, fumaric, itaconic, muconic, hexahydroterephthalic, adipic, glutaric, succinic, sebacic, suberic, tetrahydrofuranotetracarboxylic, perylenetetracarboxylic acid, the cited acids optionally being substituted by chlorine, bromine and/or alkyl groups having up to 6 carbon atoms. Suitable are also polycarboxylic acids containing amino groups, for example amide acids optained by reaction of maleic anhydride with diamino-diphenylmethane, diamino-diphenyl ether, diamino-dimethylsulfone, p-phenylenediamine or m-phenylenediamine with formation of amide and liberation of a carboxyl group of the maleic anhydride.

such dicarboxylic acids are preferably used for the reaction the carboxyl groups of which are not in orthoposition and/or such at least trivalent carboxylic acids two carboxyl groups of which at least are in ortho-position, because this ensures the maintenance of a high linearity of the polymer chain.

Suitable polyisocyanates for the precondensation with the polycarboxylic acids are those already mentioned above for the reaction with the oxamide acid esters; the di-isocyanates having radicals R' according to the formulae (IV) and (V) being preferred. Thus, structural anits such as (VII), (VIII), (IX) and (X) (see enclosed formula sheets), where X, R''', and y are as defined in formula (IV), are obtained. Among these structural units, especially suitable are those of the formulae (IX) and (X), where R'''is H, CH₃; X is O, CH₂ and y is 1.

The cited structural units obtained in this manner may be repeated several times within R' (see the reaction product of equation VI), in which case they are always linked with each other via amide, imide or amidoimide groups.

In case of the same functionality of polycarboxylic acid and polyisocyanate, the ratio of the molar equivalents should be $q : (q + 1)$, q being at least 1 and at most 40, preferably from 2 to 40 and especially from 5 to 25. A precondensate is obtained having isocyanate terminal group on the one hand, and on the other being of linear structure because of the presence of only one excess isocyanate group. In the case of different functionality of the components the molar ratios vary in corresponding and analogous manner.

The properties of the coating composition of the invention may be very advantageously improved by incorporating "branching" polycarboxylic acids into the cited precondensate. Such "branching" polycarboxylic acids may be prepared by condensation of polycarboxylic acids with other polycarboxylic acids having an amino substituent, that is, for example by condensing trimellitic, trimesic, pyromellitic or benzophenonetetracarboxylic acid (or the anhydrides thereof) with 5-aminoisophthalic or 4-aminophthalic acid. Thus, structural units such as (XI), (XII) and (XIII) (see enclosed formula sheets) are formed, which may be also repeated several times while being linked via amide, imide or amidoimide groups.

A further improvement of the properties of the coating composition of the invention, especially with respect to storage stability and adhesion of the coatings to metal substrates, may be attained by introducing chelace-forming azomethine groups of the formula (HOOC)₂ — (Ar) — N = CH — R$^{IV}$ and/or chelate-forming azo groups of the formula (HOOC)₂ — (Ar) — N = N — R$^V$ into the trion resin.

In these formulae, Ar is an aromatic radical, preferably mono- or binuclear. Furthermore, both carboxyl groups must not be in ortho- or peri-position to each other, and no carboxyl group should be in ortho-position to the azomethine and/or azo group.

R$^{IV}$ and R$^V$ are aromatic or heteroaromatic radicals, preferably mono- or binuclear, and having an OH group in orthoposition to the azomethine or azo group. R$^{IV}$ and R$^V$ may be optionally mono- or polysubstituted, preferably mono- or bisubstituted, by alkyl or monovalent functional radicals according to the definition given for R.

There are used preferably chelate-forming azo and-/or azomethine units of the following formulae:

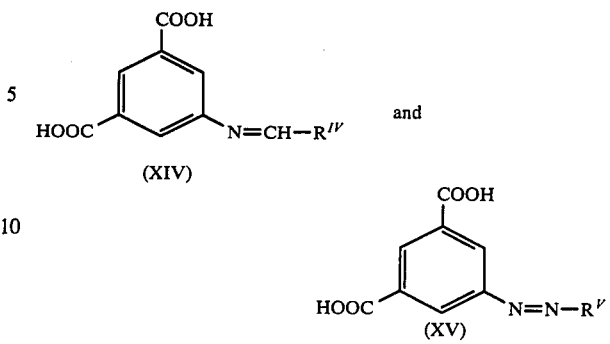

Similarly suitable are also the corresponding azomethine and/or azo derivatives of 2-amino- or 3-aminonaphthalenedicarboxylic acid —(5,7) and of 2-aminonaphthalenedicarboxylic acid —(5,8).

In the above formulae (XIV) and (XV), R$^{IV}$ and R$^V$ are a mono- or polynuclear aromatic or heteroaromatic radical having from 6 to 14 carbon atoms, preferably from 6 to 10 carbon atoms, containingg an OH group in ortho-position to the azomethine group, and optionally mono- or polysubstituted in the manner indicated under R, especially by alkyl or cycloalkyl each having up to 6 carbon atoms, furthermore aryl, preferably phenyl, fluroalkyl having preferably from 1 to 6 carbon atoms, alkoxy having preferably from 1 to 6 carbon atoms, aryloxy, preferably phenoxy, carboxyalkyl having preferably from 1 to 6 carbon atoms, ketoalkyl having preferably from 1 to 3 carbon atoms, nitro or halogen, preferably fluorine or chlorine; the radicals R$^{IV}$ or R$^V$ including all possible substituents having from 6 to 22, preferably from 6 to 10 carbon atoms.

Suitable azomethine compounds are especially the reaction products of 5-aminoisophthalic acid with salicylaldehyde, 1-naphthaldehyde, 2-hydroxy-1-naphthaldehyde, 4-methylsalicylaldehyde, 4-carboxyethyl-salicylaldehyde, 4-methoxy-salicylaldehyde, 3-chloro- or 3-bromosalicylaldehyde, 4-acetylsalicylaldehyde, 4-hydroxy diphenyl-3-aldehyde, 3-hydroxydiphenyl-4-aldehyde, p-benzylsalicylaldehyde.

Suitable azo compounds are those obtained by reaction of diazotized 5-aminoisophthalic acid with, for example, one of the following compounds: p-cresol, 2,4-dimethylphenol, 2,4-ditert.-butylphenol, p-chlorophenol, 2,4-dichlorophenol, p-hydroxyacetophenone, hydroquinone-monoethyl ether, 1-naphthol, 2-naphthol, 4-bromonaphthaol, 4-hydroxydiphenyl, 4-hydroxy-4'-ethoxydiphenyl, 4,4'-dihydroxydiphenylmethane-monomethyl ether.

The incorporation of such chelate-forming azo and-/or azomethine compounds is described in German Offenlegungsschrift No. 2,139,005. These chelate-forming compounds may be introduced into the chain before or after the reaction with the oxamide acid ester, optionally in a stepwise single-vessel reaction. Generally, the components, that is, oxamide acid ester, chelate-forming agent and, optionally, polycarboxylic acid, are dissolved or finely distributed in the solvent, and then the isocyanate in solid, liquid or dissolved form is added at temperatures of from -20° to 380° C, preferably from 0° to 250° C, especially from 50° to 200° C. Subsequently, the condensation is carried out at temperature of from 100° to 250° C. In the case of formation of the precondensate of polycarboxylic acid and isocyanate, as proposed in German Offenlegungsschrfit No. 2,303,239, the chelate-forming agent may be introduced before or after this formation, advantageously, all three components are reacted together.

The ratio of the molar equivalents of oxamide acid ester to chelate-forming azo- or azomethine compounds (or, as described below, to the chelates thereof) should be (2 to 94): (0.1 to 50), preferably (1 to 80) : (5 to 20); the sum of oxamide acid ester, chelate-forming agent or chelate and possibly present polycarboxylic acid always being 100 mol %.

The incorporation of the cited structural units, which are dicarboxylic acids capable of forming chelates improves especially the storage stability of the trion resins or trion resin solutions obtained, since these chelate-forming groups capture traces of metals possibly being present. As also described in German Offenlegungsschrift No. 2,139,005, it may be advantageous to directly incorporate metal chelates of such chelate-forming azo or azomethine groups, which may be carried out by reaction with metal compounds. The time of chelate formation may be chosen as desired, that is, before, during or after the synthesis of the total polymer chain. The chelate-forming metal compounds may thus be reacted either together with the chelate-forming azo or azomethine compounds or later. Performation of the metal chelates in a special step is also possible, and the chelates may then be introduced into the reaction. The ratio of metal compounds to chelate-forming agents should be about equimolar, preferably slightly less than equimolar.

Chelate-forming metal compounds are for example compounds of metals of the Ist to VIIIth group of the Periodic System capable of forming chelate complexes. Preferably, compounds of lithium, sodium, potassium, zinc, magnesium, barium, aluminum, titanium, lead, chromium, nickel and especially iron, cobalt or copper are used for chelate formation. Especially suitable are the oxides, hydroxides, carbonates, halides, alcoholates, phenolates, acetates, formates or naphthenates. Also complex compounds of such metals, for example of acetylacetone or of enolized acetoacetic ester are suitable.

The incorporation of such chelate-forming azo or azomethine compounds into the trion resin as structural units is for example shown in formulae (XVI) and (XVII), and that of the chelates in formula (XVIII) (see enclosed formula sheets).

For the total reaction of oxamide acid ester A', polyisocyanate B' and optionally polycarboxylic acid C' and optionally chelate-forming agent or chelate D' (when A', B', C' and D' each represent the number of the moles in question and A' through D' have the same functionality), the following equation is valid:

$$(A' + C' + D') = \alpha B',$$

where $\alpha$ is 0.95 to 1.07, especially 0.98 to 1.02. The polyisocyanate component is preferably used in a slight excess relative to the three other components. Different functionalities of the components have to be taken into consideration correspondingly.

The components of the trion resin, that is oxamide acid ester, polyisocyanate, polycarboxylic acid, azo or azomethine compound or the metal chelate thereof, may be used per se or as a mixture.

Component (c) of the coating composition of the invention is a solvent in which, on the one hand, the trion resin is readily soluble, and on the other, the low molecular weight PTFE is substantially or completely insoluble. This solvent has to be selected from the group of the so-called aprotic solvents, that is, solvents not containing any reactive protons. Furthermore, such a solvent should have a surface tension of more than 30 dyn/cm, preferably from 30 to 50 dyn/cm, that is, they should not wet the low molecular PTFE.

Suitable solvents of this kind are for example: N,N'-dimethylformamide, N,N'-dimethylacetamide, dimethylsulfoxide, nitromethane, nitroethane, nitrobenzene, benzonitrile, benzophenone, acetophenone, pyridine, quinoline, methylbenzoate, ethylbenzoate, 1,1,2,2-tetrabromoethane, 1,1,2,2-tetrachloroethane, N,N,N''-hexamethyl-phosphoric acid-trisamide, tetramethyl urea, tetramethylsulfone and, preferably, N-methylpyrrolidone. It is also possible to use mixtures of such solvents.

These aprotic solvents may optionally be replaced by other organic solvents in an amount of up to 80 %, preferably up to 60 %, especially up to 40 % of their total amount, and it is not required that these other organic solvents be aprotic or have a surface tension of more than 30 dyn/cm at 20° C. However, these other organic solvents must have a lower boiling point than the aprotic solvent used, at least by 10° C, preferably by about 30° C. Examples of such other organic solvents which may be blended with the aprotic solvents used are aromatic hydrocarbons such as benzene, toluene or xylenes, furthermore ketones or esters of organic acids such as acetone, methylbutylketone, acetic acid ethyl ester, acetic acid butyl ester and similar solvents. The component (c) solvent, preferably its aprotic amount, is advantageously used already for the preparation of the trion resin, although it is in principle possible to prepare the trion resin in the melt. Thus, the total amount of solvent, preferably of aprotic solvent, may be added already during the preparation of the trion resin, but preferably only a portion of the solvent is added in an amount which ensures that the trion resin is maintained in solution. The remaining portion of solvent, especially of the other organic solvent, is added for dilution purposes either before the addition of the fluorocarbon wax or together with the fluorocarbon wax, after mixing and homogenizing, in the form of a paste or suspension; mixing and homogenizing being carried out for example by high-speed agitation or on a roll mill. In the first case however, the required amount of fluorocarbon wax is added in solid form to the solution of the trion resin, in portions and with agitation.

The ratio of fluorocarbon wax component (a) to trion resin component (b) of the coating composition of the invention is from 90 : 10 to 10 : 90 parts by weight, preferably from 40 : 60 to 70 : 30 parts by weight.

The total amount by weight of solvents (comprising the aprotic solvent and optionally the other solvent having a lower boiling point), that is, component (c), should be 0.43 to 100 times, preferably 1.5 to 10 times, the amount of trion resin contained in the coating composition of the invention (which corresponds to a 70 to 1, preferably 40 to 10% by weight solution of trion resin).

Additionally, up to 50 weight %, preferably from 0.1 to 30 weight %, relative to the total amount of low molecular weight PTFE and trion resin (a) + (b), of usual fillers and/or pigments may be added, such fillers and/or pigments being for example: inorganic oxides such as $Al_2O_3$, $TiO_2$, $SiO_2$, iron oxide, chromium oxide, or sulfides such as molybdenum sulfide or cadmium sulfide. Further examples of such usual fillers and/or pigments are soot, graphite, cadmium selenide, metal powder or metal alloy powder, for example powdered copper, aluminum or bronze powder. These fillers or pigments may be introduced into the solution of the trion resin in the same manner as described above for the fluorocarbon wax, either together with the latter or, preferably, separately.

The coating composition of the invention so prepared is ready for coating in this form already. Coating may be carried out according to known and usual methods, such as dipping, spraying or painting. The coating composition may be applied to surfaces of substrates having a thermostability degree which allows them to withstand the subsequent baking process without damage, such as metallic substrates, for example aluminum or refined steel, or non-metallic substrates, for example ceramic materials (glazed or unglazed, such as earthenware or china), enamel or glass, but also plastic surfaces.

After being applied to the substrate, the coating layer so obtained is covered automatically by a skin of pure low molecular weight PTFE within a few minutes only. Subsequently, this coating has to be heated for a short time at a temperature of from 320° to 420° C, preferably from 340° to 400° C, in order to make the low molecular weight PTFE on the surface melt to form a firm, and to eliminate the solvent. This baking optionally causes the polymerization or completion of the polymerization of the trion resin reacted in the first step.

Because of the incorporated trion resins, the coatings obtained from the coating composition of the invention possess a number of extraordinarily advantageous properties: excellent antiadhesion, smoothing and anti-tack properties comparable with those of pure, also high molecular weight, PTFE, high abrasion resistance to mechanical strain, and still a surprising tenacity and resistance to deep-drawing. Simultaneously, the adhesion of the coating to the substrate is not only equal but even superior to that of known PTFE coatings requiring an adhesive, and no roughening pretreatment of the substrate whatsoever is required. It is very surprising that these properties are obtained in a combination of optimum values hitherto unknown.

The abovementioned melt viscosities of the fluorocarbon waxes are determined as follows: a melt extrusion by means of a high pressure capillary viscometer of Messrs. Göttfert is carried out under the following conditions: 380° C, 21 kg/cm² extrusion pressure, nozzle dimensions: diameter 1mm and length 10 mm. The amount of extruded melt leaving such a nozzle at the given temperature and pressure within the unit of time is determined, from which the apparent melt viscosity is calculated according to the following equation:

$$\eta = \frac{P \cdot \pi \cdot r^4}{8 \cdot l \cdot q}$$

$P$ = extrusion pressure (dyn/cm²)
$r$ = radius of nozzle (cm)
$l$ = length of nozzle (cm)
$q$ = amount of discharged extrusion product (cm³/sec). The following examples illustrate the invention. In these examples, the adhesion of the coatings was tested according to German Industrial Standard DIN 53 151, the pendulum hardness according to DIN 53 157 and the capability for deepdrawing according to DIN 53 156 (Erichsen test). The cited surface tension data were obtained by measuring according to the so-called bubble bursting method (surface tension apparatus according to Cassel).

EXAMPLE 1

A mixture of 99.6 g (0.6 mol) of isophthalic acid, 57.8 g (0.3 mol) of trimellitic anhydride, 252 g (1 mol) of 4,4'-diisocyanato-diphenylmethane and 1 g of N,N'-tetramethylhexamethylenediamine as catalyst, dissolved in 1360 g of N-methylpyrrolidone, is stirred for 5 hours at 95° C. Subsequently, 43 g (0.1 mol) of 4,4'-bis-(ethoxalylamino)-diphenylmethane is added in portions within one hour to the precondensate obtained, and the temperature is raised to 195° C. When this temperature is attained, agitation is continued for 6 hours. 112 parts by weight of N-methylpyrrolidone are added to 100 parts by weight of the trion resin solution obtained, and subsequently, 37 parts by weight of fluorocarbon wax are added in portions with vigorous agitation. This fluorocarbon wax is a low molecular PTFE prepared by a 30 minutes tempering of high molecular PTFE at 520° C and grinding of the reaction product after cooling in a hammer classifer mill. The mean particle diameter is 6 microns, the melt viscosity $2.9 \cdot 10^2$ poises at 380° C and the specific surface 9.0 m²/g according to BET.

The lacquer so obtained is sprayed on aluminum plates by means of a spray gun, and baked for 15 minutes at 150° C and subsequently for a further 10 minutes at 360° C. The thickness of the coating so obtained is 30 microns.

The adhesion, tested according to the grate cutting method of German Industrial Standard DIN 53 151, is evaluated as being GT O, that is, the cut edges are entirely smooth and no fragment of the coating is chipped off. Furthermore, the coating has a pendulum hardness of 85 seconds and an indentation according to Erichsen of 6.5 mm. Milk burnt on the coating until it has become black can be removed by a water jet of a normal waterpipe without leaving any traces.

EXAMPLE 2

A suspension of 150 parts of N-methylpyrrolidone and 50 parts of fluorocarbon wax is prepared by means of a high-speed agitator (10 000 rmp). The fluorocarbon wax was prepared according to German Offenlegungsschrift No. 2,235,885 by telomerization of monomer TFE in the presence of 4 weight % of chloroform as telogene in an aqueous dispersion. The melt viscosity of this fluorocarbon wax is $7.4 \cdot 10^3$ poises at 380° C, the specific surface according to BET is 19 m²g, the mean size of the primary particle is 2.0 microns. Furthermore, a trion resin solution is prepared as follows: 53 g (0.32 mol) of isophthalic acid, 55 g (0.28 mol) of trimellitic anhydride, 0.5 g of tributylamine as catalyst, 700 g of N-methylpyrrolidone and 196g(0.7 mol) of 3,3'-dimethyl-4,4'-di-isocyanatodiphenylmethane are stirred for 6 hours at 80° C. The precondensate so obtained is reacted for 6 hours at 200° C with 43 g (0.1 mol) of 4,4'-bis-(ethoxalylamino)-diphenylmethane, until the separation of $CO_2$ has come to an end. 120 parts by weight of the above fluorocarbon wax suspension are stirred into 100 parts by weight of the trion resin solution. Cooking pans are coated with the composition obtained and baked first for 15 minutes at 150° C and then for a further 10 minutes at 400° C. A non-marring and durable coating is obtained which prevents adhesion of food while cooking. Aluminum plates coated according to Example 1 have a grate cutting value of GT O, a pendulum hardness of 95 seconds and an indentation according to Erichsen of 4.3 mm.

EXAMPLE 3

53 g (0.32 mol) of isophthalic acid, 53 g (0.27 mol) of trimellitic anhydride, 3 g (0.01 mol) of an azomethine obtained by reaction of 5-amino-isophthalic acid with salicylaldehyde, 0.85 g of tributylamine as catalyst, 196 g (0.7 mol) of 3.3'-dimethyl-4,4'-di-isocyanato-diphenylmethane and 700 g of N-methylprrolidone are stirred for 6 hours at 80° C. Subsequently, 43 g (0.1 mol) of 4,4'-bis-(ethoxalylamino)-diphenylmethane are stirred into the above mixture. The temperature is then raised to 195°C, and agitation is continued for a further 6 hours at this temperature. The fluorocarbon wax suspension as described in Example 2 is added to the trion resin solution so obtained in the same weight ratio.

Disks of disk saws are coated with the coating composition obtained and baked at 350° C. Bubble-free and durable coating having a thickness of up to 40 microns are obtained which prevent sticking of resin and impart good sliding properties to the disks. Aluminum plates coated according to Example 1 have a grate cutting test result of GT 0, a pendulum hardness of 97 seconds and an indentation according to Erichsen of 4.3 mm.

EXAMPLE 4

A mixture of 91 g (0.55 mol) of isophthalic acid, 58 g (0.3 mol) of trimellitic anhydride, 18 g (0.05 mol) of the acid imide formed by reaction of trimellitic anhydride with 5-aminoisphthalic acid, 250 g (1 mol) of 4,4'-di-isocyanatodiphenylmethane and 1 g N,N'-tetramethyl-hexamethylenediamine as catalyst, dissolved in 1980 g of N-methylpyrrolidone, is stirred for 5 hours at 95° C. Subsequently, 43 g (0.1 mol) of 4,4'-bis-(ethoxalylamino)-diphenylmethane are added in portions within one hour, and the temperature is raised to 195° C. After this temperature is attained, the reaction is carried out by further agitaton for 6 hours. 90 parts by weight of a suspension containing 24 weight % of fluorocarbon wax, 1 weight % of soot and 75 weight % of dimethylformamide are added with agitation to 100 parts by weight of this trion resin solution. The fluorocarbon wax used was obtained by telomerization (see Example 2) in the presence of 3.5 weight % of chloroform. Its melt viscosity is $12.5 \cdot 10^3$ poises at 380° C, the specific surface 14 m$^2$/g, the mean size of the primary particles 2.4 microns. An aluminum plate coated according to Example 1 has a grate cutting test result of GT 0, a pendulum hardness of 110 seconds and an Erichsen indentation of 3.8 mm.

EXAMPLE 5

100 parts by weight of the trion resin solution as described in Example 1 are mixed with 112 parts by weight of dimethylformamide. 35 parts by weight of fluorocarbon wax and 5 parts by weight of iron oxide brown are added to this solution with high-speed agitaton. The fluorocarbon wax has been obtained by degradation of high molecular weight disperse PTFE by means of a dose of 5 Mrad of gamma rays. Its melt viscosity is $10^4$ poises at 380°C and its specific surface according to BET is 5.7 M$^2$/g. This lacquer yields red-brown coatings having good anti-adhesion properties. The results of a coated aluminum plate are the same as in Example 1.

EXAMPLE 6

252 g (1 mol) of 4,4'-di-isocyanato-diphenylmethane and 398 g (1 mol) of 4,4'-bis-(ethoxalylamino)-diphenylmethane are dissolved in 1510 g of N-methylpyrrolidone. Subsequently, 3.5 g of dibutylstannic oxide are added as catalyst, and the solution is heated slowly to 205° C with agitaton. At this temperature, agitation is continued until no ethanol is formed any more.

Furthermore, a suspension of 50 g of fluorocarbon wax, 150 g of N-methylpyrrolidone and 50 g of methyl-ethylketone is prepared by means of high-speed agitation (10 000 rpm). The fluorocarbon wax corresponds to that of Example 2.

100 parts by weight of the above trion resin solution are blended with 120 parts by weight of the fluorocarbon wax suspension. Aluminum plates coated with this lacquer according to the conditions given in Example 1 have a grate cutting test result of GT 0, a pendulum hardness of 85 seconds and an Erichsen indentation of 2.1 mm. Milk burnt until it has become black may be removed without traces by means of a water jet from a normal waterpipe.

EXAMPLE 7

199 g (0.5 mol) of 4,4'-bis-(ethoxalylamino)-diphenylmethane, 273 g (0.5 mol) of a bis-imide acid prepared by reaction of 2 mols of trimellitic anhydride with 1 mol of 4,4'-diamino-diphenylmethane, and 252 g (1 mol) of di-isocyanato-diphenylmethane are dissolved in 1680 g of N-methylpyrrolidone. Subsequently, the whole is heated to 110° C with agitation, and 3.6 g of 1,4-diazabicyclo-[2,2,2]-octane as catalyst are added. The temperature is slowly raised to 190° C. Agitation is continued at this temperature, until no $CO_2$ and ethanol are formed any more.

100 parts by weight of the trion resin isolution so obtained are diluted with 50 parts by weight of N-methylpyrrolidone and 30 parts by weight of ethyl acetate, and 20 parts by weight of fluorocarbon wax are added in portions with vigorous agitation (10 000 rpm). The fluorocarbon wax is identical to that of Example 1. According to Example 1, aluminum plates are coated with the lacquer obtained, and the following results are obtained: grate cutting test GT 0, pendulum hardness 83 seconds, Erichsen indentation 2.3 mm. Milk burnt until it has become black may be removed without traces by means of a water jet from a normal waterpipe.

EXAMPLE 8

A mixture of 99.6 g (0.6 mol) of isophthalic acid, 57.8 g (0.3 mol) of trimellitic anhydride, 252 g (1 mol) of 4,4'-diisocyanato-diphenylether and 1 g of N,N'-tetramethylhexamethylenediamine as catalyst, dissolved in 1360 g of N-methylphyrrolidone, are stirred for 5 hours at 95° C. Subsequently, 40 g (0.1 mol) of bis-(ethoxalylamino)-diphenyl ether are added in portions within one hour to the precondensate obtained, and the temperature is raised to 195° C. After having attained this temperature, agitation is continued for 6 hours. 100 parts by weight of the trion resin solution so obtained are diluted with 150 parts by weight of N-methylpyrrolidone, and 37 parts by weight of fluorocarbon wax are added with vigorous agitation. The fluorocarbon wax corresponds to that of Example 1. The lacquer obtained is applied to aluminum plates and baked as indicated in Example 1.

The adhesion, tests according to the grate cutting test, has a value of GT 0. The coating has a pendulum hardness of 104 seconds and an Erichsen indentation of 7.8 mm. Milk burnt until it has become black may be removed without traces as in the preceding Examples.

EXAMPLE 9

53 g (0.32 mol) of isophthalic acid, 53 g (0.27 mol) of trimellitic anhydride, 3.1 g (0.01 mol) of an azo compound obtained by coupling p-cresol with 3,5-dicarboxy-phenyldiazonium chloride, 0.85 g of tributylamine as catalyst, 196 g (0.7 mol) of 3,3'-dimethyl-4,4'-di-isocyanato-diphenylmethane and 700 g of dimethylsulfoxide are stirred for 6 hours at 70°C. Subsequently, 43 g (0.1 mol) of 4,4'-bis-(ethoxalylamino)-diphenylmethane are stirred in. The temperature is raised to 155°C, and agitation is continued for a further 6 hours at this temperature. The trion resin solution so obtained is blended with the fluorocarbon wax suspension described in Example 2 in a weight ratio of 1:1.

Aluminum plates coated according to Example 1 have the following test results: grate cutting number GT 0, pendulum hardness 95 seconds and Erichsen indentation 3.8 mm. Milk burnt until it has become black is removed without traces as in the preceding Examples.

EXAMPLE 10

A mixture of 91 g (0.55 mol) of isophthalic acid, 58 g (0.3 mol) of trimellitic anhydride, 3.5 g (0.01 mol) of azomethine prepared by reaction of 5-aminophthalic acid with 1'-hydroxy-2'-naphthaldehyde, 250 g (1 mol) of 4,4'-di-isocyanatodiphenylmethane and 1 g of N,N'-tetramethylhexamethylenediamine as catalyst, dissolved in 1980 g of diacetamide, is stirred for 5 hours at 90° C. Subsequently, 43 g (0.1 mol) of 4,4'-bis-(ethoxalylamino)-diphenylmethane are added in portions, and the temperature is raised to 160° C. After this temperature is attained, the reaction is completed by continuing the agitation for a further 6 hours. Subsequently, the reaction product is allowed to cool to 80° C, and 1.3 g (0.005 mol) of cobalt(II)-acetylacetonate are stirred in. Agitation is then continued for a further 2 hours at this temperature.

90 parts by weight of a suspension of 20 weight % of fluorocarbon wax, 2 weight % of soot, 3 weight % of molybdenum (IV) sulfide (Microfine), 40 weight % of dimethylacetamide, 10 weight % of N-methylpyrrolidone, 10 weight % of toluene and 15 weight % of xylene are added to 100 parts by weight of this trion resin solution. The fluorocarbon wax used is described in Example 4.

The coatings obtained according to Example 1 using the lacquer so obtained have a grate cutting test result of GT 0, a pendulum hardness of 97 seconds and an Erichsen indentation of 3.8 mm. Burnt milk is removed without traces as described above.

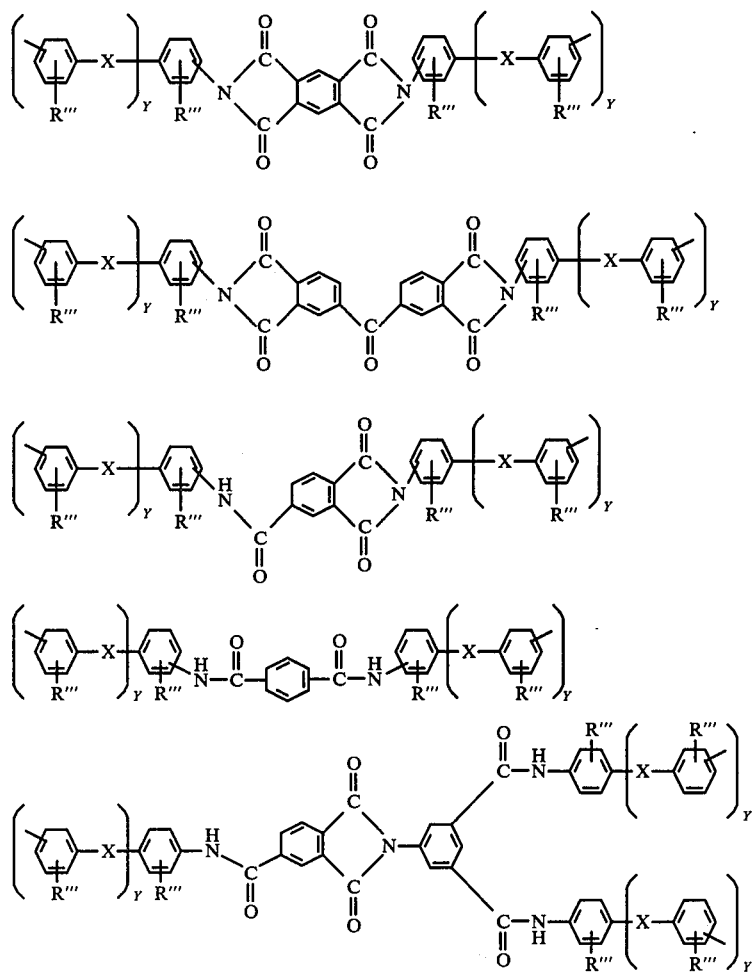

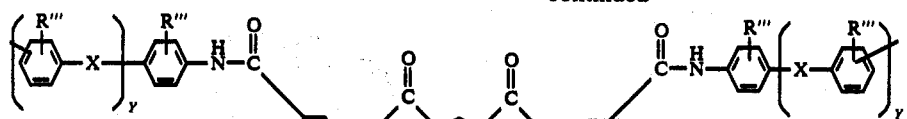

XII

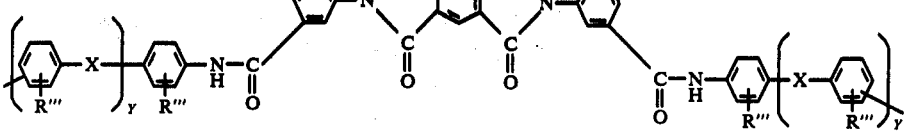

XIII

XVI

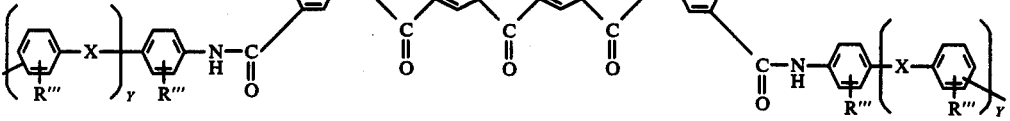

XVII

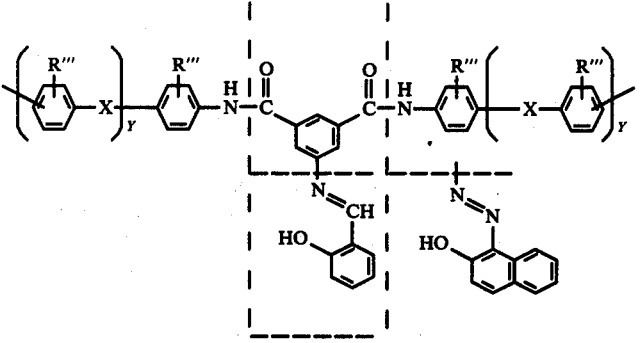

XVIII

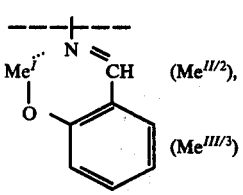

We claim:

1. Coating composition for application as one-coat system which comprises
   a. from 10 to 90 parts by weight of a low molecular weight polytetrafluorethylene having a melt viscosity of from $10^1$ to $10^8$ poises (measured at 380° C by means of the high pressure capillary viscometer), a specific surface of from 1 to 40 m²/g (measured according to the BET method), and a mean particle diameter of from 0.1 to 50 microns;
   b. from 90 to 10 parts by weight of a polymer containing triketo-imidazolidine rings and repeated units of the formula

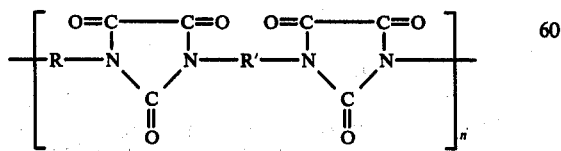

where
R is a mono- to trinuclear, bi- to tetravalent aromatic radical, the aromatic radicals optionally being also quinones, and in polynuclear systems the aromatic radicals optionally being linked by aliphatic radicals or hetero atoms, furthermore the aromatic radicals optionally being mono- or polysubstituted by alkyl, cycloalkyl, alkoxy, aryl or monovalent functional radicals, R' is as defined for R or an aliphatic or cycloaliphatic hydrocarbon radical, n is an integer of from 1 to 70, and c. an aprotic organic solvent having a surface tension of more than 30 dyn/cm, in an amount by weight of from 0.43 to 100 times that of component b); up to 80% of the amount by weight of this aprotic solvent having a surface tension of more than 30 dyn/cm optionally being replaced by another organic solvent not meeting at least one of the two cited requirements, but necessarily having a boiling point at least 10° C lower than the boiling point of the aprotic solvent.

2. Coating composition for application as one-coat system which comprises
   a. from 10 to 90 parts by weight of a low molecular weight polytetrafluorethylene having a melt viscosity of from $10^1$ to $10^8$ poises (measured at 380° C by means of the high pressure capillary viscometer), a specific surface of from 1 to 40 m²/g (measured according to BET method), and a mean particle diameter of from 0.1 to 50 microns;

b. from 90 to 10 parts by weight of a polymer containing triketo-imidazolidine rings and repeated units of the formula

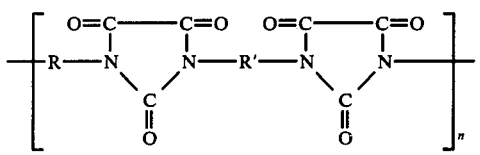

where
- R is a mono- to trinuclear, bi- to tetravalent aromatic radical, sthe aromatic radicals optionally being also quinones, and in polynulcear systems the aromatic radicals optionally being linked by aliphatic radicals or hetero atoms, furthermore the aromatic radicals optionally being mono- or polysubstituted by alkyl, cycloalkyl, alkoxy, aryl or monovalent functional radicals,
- R' is as defined for R or an aliphatic or cycloaliphatic hydrocarbon radical, R' optionally being interrupted by one or more of the following groups:
  - $b_1$. amide, imide and/or amidoimide groups, obtained by introduction of polycarboxylic acids, the ratio of the molar equivalents polycarboxylic acid : polyisocyanate being $q : (q + 1)$, and $q$ being from 1 to 40,
  - $b_{21}$. chelate forming azo or azomethine groups;
  - $b_{22}$. metal chelates of such azo or azomethine groups; the ratio of the molar equivalents of the oxamide acid ester to chelate-forming agents and/or metal chelates being (2 to 94) : (0.1 to 50), and the sum of oxamide acid ester, chelate-forming agent or chelate and possibly present polycarboxylic acids always being 100 mol %,
- n is an integer of from 1 to 70, and c. an aprotic organic solvent having a surface tension of more than 30 dyn/cm, is an amount by weight of from 0.43 to 100 times that of component (b); up to 80% of the amount by weight of this aprotic solvent having a surface tension of more than 30 dyn/cm optionally being replaced by another organic solvent not meeting at least one of the two cited requirements, but necessarily having a boiling point at least 10° C lower than the boiling point of the aprotic solvent.

3. Coating composition as claimed in claim 1, wherein R is a radical of the formula

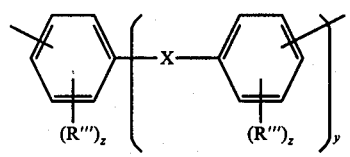

where
R''' is H or CH$_3$,
X is O, S, CH$_2$, SO$_2$ or zero,
y is 1 or zero,
z is from 1 to 3, or

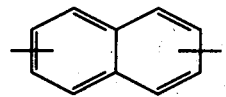

4. Coating composition as claimed in claim 2, wherein R is a radical of the formula

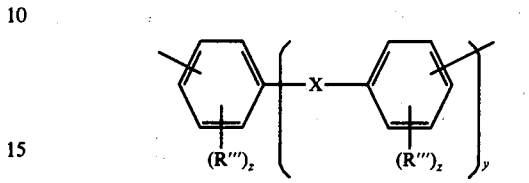

where
R''' is H or CH$_3$,
X is O, S, CH$_2$, SO$_2$ or zero,
y is 1 or zero,
z is from 1 to 3, or

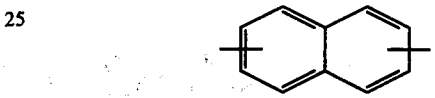

5. Coating composition as claimed in claim 1, wherein component (b) is prepared by reaction of oxamide acid esters of the formula $$R - (NH - CO - COOR'')_r$$

and polyisocyanates of the formula $$R' - N = C = O)_s$$

in a molar ratio of oxamide acid ester : polyisocyanate of 1 : (0.8 to 2.2), the functionality of $r$ and $s$ being identical, R and R' being as defined in claim 1, R'' being a hydrocarbon radical, $r$ an integer of from 2 to 4 and $s$ an integer of from 2 to 6.

6. Coating composition as claimed in claim 5, wherein $r$ and $s$ are 2.

7. Coating composition as claimed in claim 4, which comprises additionally introducing reaction products of polyisocyanates and polycarboxylic acids, the ratio of the molar equivalents polycarboxylic acid : polyisocyanate being $q : (q + 1)$, and $q = 1$ to 40.

8. Coating composition as claimed in claim 2, which comprises using as chelate-forming structural unit as azomethine unit of the formula

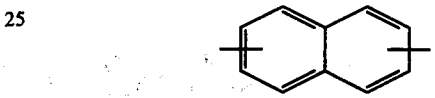

where R$^{IV}$ is a mono- or binuclear aromatic radical having from 6 to 14 carbon atoms containing an OH group in orthoposition to the azomethine group.

9. Coating composition as claimed in claim 2, which comprises using as chelate-forming structural unit an azo unit of the formula

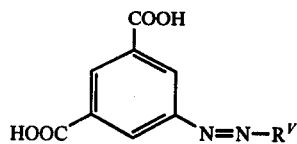

where $R^V$ is as defined in claim 8 for $R^{IV}$.

10. Coating composition as claimed in claim 1, which comprises additionally up to 50 weight % relative to components (a) and (b) of usual fillers and/or pigments.

11. Coating composition as claimed in claim 2, which comprises additionally up to 50 weight % relative to components (a) and (b) of usual fillers and/or pigments 12. A process for the coating of surfaces, wherein the coating composition as claimed in claim 1 is used.

13. A process for the coating of surfaces, wherein the coating composition as claimed in claim 2 is used.

14. A process as claimed in claim 12, wherein the surface to be coated is made of metal, glass or ceramic materials.

15. A process as claimed in claim 13, wherein the surface to be coated is made of letal, glass or ceramic materials.

* * * * *